UNITED STATES PATENT OFFICE.

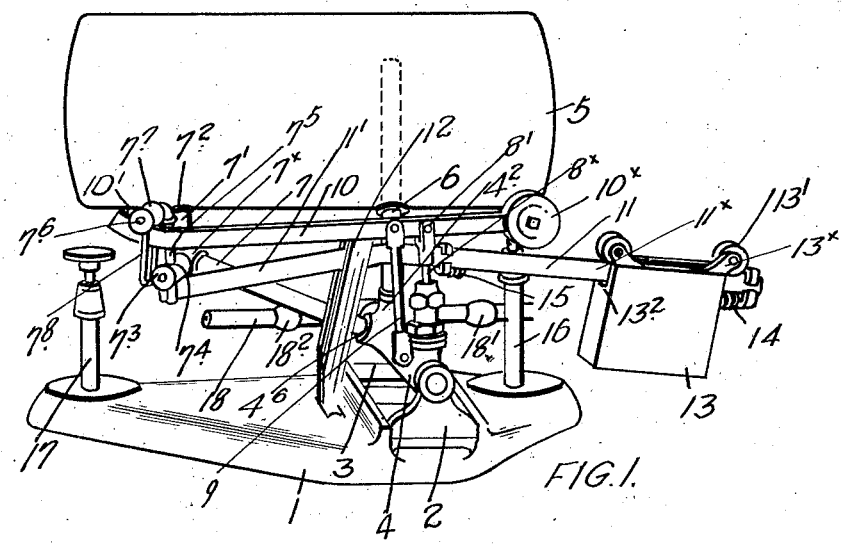
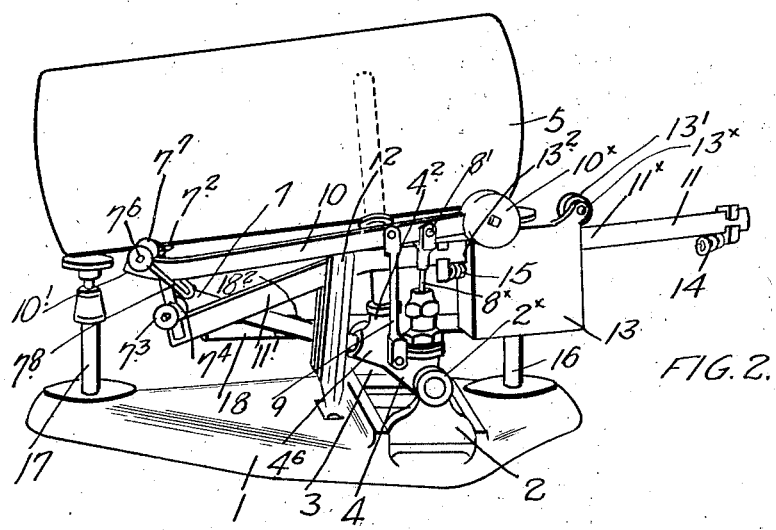
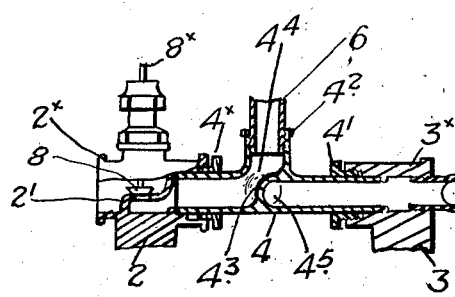

GEORGE HERBERT KING, DECEASED, LATE OF WOODSTOCK, ONTARIO, CANADA, BY ANNIE CHARLOTTE KING, EXECUTRIX, AND WILLIAM RUSSELL BICKLE, EXECUTOR, BOTH OF WOODSTOCK, CANADA.

CONDENSATION-RETURN TRAP FOR HEATING SYSTEMS.

1,362,424.  Specification of Letters Patent.  Patented Dec. 14, 1920.

Application filed July 28, 1919. Serial No. 313,925.

*To all whom it may concern:*

Be it known that GEORGE HERBERT KING, deceased, late of the city of Woodstock, in the county of Oxford, in the Province of Ontario, Canada, did invent certain new and useful Improvements in Condensation-Return Traps for Heating Systems, of which the following is the specification.

His invention relates to improvements in condensation return traps for heating systems and the object of the invention is to devise a trap having a tilting tank means for insuring of the complete discharge of the entire tank contents at each tilting operation and it consists essentially of providing the return lever with a movable counterweight whereby the leverage produced is increased during the tank tilting operation and reduced during the discharge operation as hereinafter more particularly explained.

Figure 1 is a perspective view of his trap shown in the normal position.

Fig. 2, is a similar view to Fig. 1, showing the trap in the discharge position.

Fig. 3 is a sectional view of the pivotal support for the tank.

In the drawings like characters of reference indicate corresponding parts in the various figures.

1 indicates the base to which is secured standards 2 and 3 having sleeve-like upper ends $2^x$ and $3^x$. Within the sleeve-like portion $2^x$ is formed a valve seat $2'$ for a purpose which will hereinafter appear.

4 indicates a tubular member journaled at its ends in the sleeve-like portions $2^x$ and $3^x$, the ends of the tubular portion 4 being packed by suitable packing glands $4^x$ and $4'$ within the ends of the sleeves $2^x$ and $3^x$. The tubular portion 4 is provided centrally with an upwardly extending arm $4^2$. $4^3$ indicates a partition dividing the tubular portion 4 so as to form a passageway $4^4$ leading to the upwardly extending arm $4^2$ and a passageway $4^5$ leading to an inclined arm $4^6$. 5 indicates a tilting tank. 6 indicates a pipe extending from the arm $4^2$ and passing upwardly through a suitable union $5^x$ into the interior of the tank to the upper portion thereof. 7 indicates an inclined pipe leading from the arm $4^6$ and connected by an elbow $7^x$ to a pipe $7'$ connected to the bottom of the tank at $7^2$ and entering the same and through which the contents of the tank are discharged. $7^3$ indicates an arm extending outwardly from the elbow $7^x$ provided with a diametric orifice $7^4$. $7^5$ indicates a rod secured in the orifice $7^4$ by a set screw or other suitable means. The upper end of the rod $7^5$ is provided with an outturned portion $7^6$ on which is journaled a roller $7^7$ having a depending U-shaped loop $7^8$. 8 indicates a valve co-acting with the valve seat $2'$. $8^x$ indicates the stem of the valve 8, the stem $8^x$ being provided at its upper end with a forked member $8'$.

9 indicates a link bar pivoted at its lower end at $9^x$ to a suitable portion of the bearing sleeve $2^x$. 10 indicates a lever fulcrumed upon the upper end of the link bar 9 and pivotally connected between the jaws of the member $8'$. The short arm of the lever 10 is provided with a counterweight $10^x$ and the long arm with a slightly upturned curved portion $10'$ extending beneath the roller $7^7$ and through the loop $7^8$. 11 indicates the discharge lever pivotally mounted intermediately of its length upon a swinging arm 12 pivotally mounted at its lower end in the base 1.

In his construction he formed the lever 11 and portions $11^x$ and $11'$ inclined downwardly in broad V-form, the portion $11'$ extending beneath the projection $7^3$. Upon the portion $11^x$ is mounted a counterweight 13 and movable freely longitudinally of such portion, the counterweight 13 being provided with lugs $13^x$ in which grooved rollers $13'$ are journaled and a longitudinal groove $13^2$ through which the portion $11^x$ extends so that the rollers 13 bear freely upon the upper edge of the portion $11^x$.

14 and 15 indicate spring buffers against which the weight is carried at each limit of its movement. 16 and 17 indicate standard supports for the tank so as to limit its movement at each operation. 18 indicates a pipe connected by a T-joint $18^x$ to the outer end of the sleeve $3^x$. The pipe 18 is provided with non-return valves $18'$ and $18^2$.

Having described the principal parts involved in his invention the operation of the same will now briefly be described.

Normally the position of the parts is that shown in Fig. 1. As the condensations collect in the system they pass down to the pipe 18 and through the non-return valve $18'$, passing through the T-joint $18^x$ and through the passageway 4⁵ up the inclined pipe 7 into the tank 5. In this position of the parts it will be noticed that the weight 13 is supported upon the outer end of the portion 11ˣ of the lever 11 and, therefore, its leverage is at maximum, the opposite end of the lever bearing upon the partition 7³ and supporting the tank in a normal position until it is filled to the required extent. As soon as the tank is sufficiently filled to overcome the leverage of the counterweight 13 it tilts into the position shown in Fig. 2, carrying the portion 11ˣ of the lever 11 into an outwardly inclined position, causing the weight 13 to slide down the portion 11ˣ toward the fulcrum point of the lever thereby reducing its leverage. Simultaneously with this operation the roller 7⁷ engages the lever 10 tilting it on its fulcrum formed by the link bar 9 and pulling the valve stem 8ˣ upward thereby opening the valve 8 and allowing steam, which is supplied by a pipe X, to the interior of the sleeve 2ˣ to pass through the seat 2′, through the passageway 4⁴ and up the pipe 6 into the top of the tank creating a pressure on the top of the water therein and equalizing it with the pressure in the boiler so that the water is forced to return down the pipe 7 and through the passage 4⁵ into the T-pipe 18ˣ and thence through the pipe 18 and non-return valve 18² to the boiler. As soon as the tank is completely emptied the weight of the counterweight 13 is sufficient in the position to which it has been moved and shown in Fig. 2, to return the tank back to the normal position shown in Fig. 1. By this means he devised a return trap, the capacity of which is greatly in excess of any tilting return machine hitherto used. Hitherto machines of this class have been operated with a large amount of water always remaining in the tank thereby losing valuable heat units and cutting down the boiler feeding capacity of the machine.

What he claimed as his invention was—

In a condensation return trap for heating systems, a tank pivotally supported adjacent one end and having a downwardly tilted discharge end, a lever of broad V-form pivotally supported intermediate its ends and having said ends directed downwardly, said lever having one end thereof disposed to bear upwardly against the downwardly tilted end of the tank, a counter-weight having a passage through which the opposite end of the lever freely extends and spring buffer members carried by the lever on opposite sides of said counter-weight adapted to limit the movement of the counter-weight on the lever, said counter-weight being movable on said lever to increase the leverage during the tank tilting operation and to decrease the leverage during the discharge operation.

ANNIE CHARLOTTE KING,
*Executrix*,
WILLIAM RUSSELL BICKLE,
*Executor*,
*Of George Herbert King, deceased.*

Witnesses:
GERTRUDE NICHOLSON,
J. W. G. MITCHELL.